US008078399B2

(12) United States Patent
Ariyur et al.

(10) Patent No.: US 8,078,399 B2
(45) Date of Patent: Dec. 13, 2011

(54) METHOD AND DEVICE FOR THREE-DIMENSIONAL PATH PLANNING TO AVOID OBSTACLES USING MULTIPLE PLANES

(75) Inventors: Kartik B. Ariyur, Minneapolis, MN (US); Eric Lautenschlager, Bloomington, MN (US); Michael R. Elgersma, Plymouth, MN (US)

(73) Assignee: Honeywell International Inc., Morristown, NJ (US)

( * ) Notice: Subject to any disclaimer, the term of this patent is extended or adjusted under 35 U.S.C. 154(b) by 947 days.

(21) Appl. No.: 12/045,449

(22) Filed: Mar. 10, 2008

(65) Prior Publication Data

US 2009/0228205 A1 Sep. 10, 2009

(51) Int. Cl.
*G01C 21/00* (2006.01)

(52) U.S. Cl. ........................................ 701/209; 701/220

(58) Field of Classification Search ......................... None
See application file for complete search history.

(56) References Cited

U.S. PATENT DOCUMENTS 5,379,223 A 1/1995 Asplund
5,440,079 A * 8/1995 Mathur et al. ............. 178/18.05
5,904,730 A 5/1999 Yamazaki et al.
6,038,502 A 3/2000 Sudo
6,084,989 A 7/2000 Eppler
6,141,293 A 10/2000 Amorai-Moriya et al.
6,249,738 B1 6/2001 Higashimata et al.
6,377,875 B1 4/2002 Schwaerzler
6,567,749 B2 5/2003 Matsuura
6,577,269 B2 6/2003 Woodington et al.
6,597,981 B2 7/2003 Nishira et al.
6,834,380 B2 12/2004 Khazei
6,907,336 B2 6/2005 Gray et al.
6,926,233 B1 8/2005 Corcoran, III
7,093,211 B1 8/2006 Downey et al.
7,110,881 B2 9/2006 Gray et al.
2005/0021192 A1 1/2005 Takafuji et al.

(Continued)

FOREIGN PATENT DOCUMENTS

WO 0146766 6/2001

OTHER PUBLICATIONS

Jackson et al., "Airborne Technology for Distributed Air Traffic Management", "European Journal of Control", Dec. 2005, pp. 1-14, vol. 11, Publisher: EUCA.

(Continued)

*Primary Examiner* — Ryan Zeender
*Assistant Examiner* — Paul Danneman
(74) *Attorney, Agent, or Firm* — Fogg & Powers LLC

(57) ABSTRACT

An obstacle-avoidance-processor chip for three-dimensional path planning comprises an analog processing circuit and at least two analog-resistive-grid networks. The analog processing circuit is communicatively coupled to receive data from an inertial measurement unit and from at least one obstacle-detection sensor. The analog processing circuit is configured to construct a three-dimensional obstacle map of an environment based on the received data. The at least two analog-resistive-grid networks are configured to map obstacles in at least two respective non-parallel planes in the constructed three-dimensional obstacle map. The at least two analog-resistive-grid networks form a quasi-three-dimensional representation of the environment. The obstacle-avoidance-processor chip generates information indicative of a three-dimensional unobstructed path in the environment based on the obstacle maps.

18 Claims, 8 Drawing Sheets

U.S. PATENT DOCUMENTS

| | | | |
|---|---|---|---|
| 2006/0293856 | A1 | 12/2006 | Foessel et al. |
| 2007/0046677 | A1 | 3/2007 | Hong et al. |
| 2007/0193798 | A1 | 8/2007 | Allard et al. |
| 2007/0241886 | A1 | 10/2007 | Breeding |

OTHER PUBLICATIONS

Connolly, C.I. et al., “Path Planning Using Laplace’s Equation”, “Computer and Information Science Department”, Feb. 7, 1994, Publisher: University of Massachusetts at Amherst, Published in: Massachusetts USA.

Connolly, Christopher et al., “On the Applications of Harmonic Functions to Robotics”, “Journal of Robotics Systems”, Oct. 9, 1993, pp. 931-946, vol. 10, No. 7, Publisher: University of Massachusetts at Amhurst, Published in: Massachusetts USA.

Philipp et al., “Single-Chip Stereo Imager”, “2006 IEEE International Solid-State Circuits Conference”, 2006, Publisher: IEEE, Published in: Baltimore MD.

Li, Z.X. and T.D. Bui, “Robot Path Planning Using Fluid Model”, “Journal of Intelligent and Robotic Systems”, 1998, pp. 29-50, vol. 21, Publisher: Kluwer Academic Publishers, Published in: Montreal Canada.

Philipp, Ralf, “A Single-Chip Stereo Imager”, “Computational Sensory Motor Systems Lab”, Jun. 2, 2005, Publisher: John Hopkins University, Published in: New York, US.

Ramirez-Angulo et al., “Real Time Solution of Laplace Equation Using Analog VLSI Circuits”, “IEEE International Symposium Circuits and Systems”, 1994, pp. 95-98, vol. 4, Publisher: IEEE, Published in: Las Cruces, NM USA.

Stan et al., “Analog VLSI for Robot Path Planning”, “Journal of VLSI Signal Processing”, 1994, pp. 61-73, vol. 8, Publisher: Kluwer Academic Publishers, Published in: Boston MA.

Thrun, Sebastian, “Learning Occupancy Grids With Forward Models”, “School of Computer Science http://www.cs.cmu.edu/~thrun”, 2001, Publisher: Carnegie Mellon University, Published in: Pittsburgh, USA.

Valavanis, Kimon et al., “Mobile Robot Navigation in 2-D Dynamic Environments Using an Electrostatic Potential Field”, “IEEE Transaction on Systems, Man and Cybernetics-Part A: Systema and Humans”, 2000, pp. 187-196, vol. 30, No. 2, Publisher: IEEE.

* cited by examiner

METHOD AND DEVICE FOR THREE-DIMENSIONAL PATH PLANNING TO AVOID OBSTACLES USING MULTIPLE PLANES

CROSS REFERENCE TO RELATED APPLICATIONS

This application is related to U.S. patent application Ser. No. 11/470,099 having a title of "METHOD FOR COLLISION AVOIDANCE OF UNMANNED AERIAL VEHICLE WITH OTHER AIRCRAFT" (also referred to here as the "'099 Application"), filed on Sep. 5, 2006.

This application is also related to U.S. Provisional Patent Application Ser. No. 60/975,967 having a title of "METHOD AND SYSTEM FOR AUTOMATIC PATH PLANNING AND OBSTACLE/COLLISION AVOIDANCE OF AUTONOMOUS AERIAL VEHICLES" (also referred to here as the "'967 Application"), filed on Sep. 28, 2007.

This application is also related to U.S. Provisional Patent Application Ser. No. 60/975,969 having a title of "METHOD AND SYSTEM FOR AUTOMATIC PATH PLANNING AND OBSTACLE/COLLISION AVOIDANCE OF AUTONOMOUS GROUND VEHICLES" (also referred to here as the "'969 Application"), filed on Sep. 28, 2007.

The '099, 967, and '969 Applications are hereby incorporated herein by reference.

BACKGROUND

Three-dimensional autonomous navigation is computationally intensive. Three-dimensional autonomous navigation systems developed for large platforms have not been transferred to smaller vehicles, since the smaller vehicles cannot handle the computation. One method of three-dimensional autonomous navigation uses Laplacian path planning, which uses two preset voltage or potential levels. To reduce power consumption for computation in such a navigation system, a dedicated chip can be used. However, in order to solve Laplace's equation in three-dimensions a complex circuit, which requires the use of sacrificial layers during fabrication, is required. The manufacture of such complex circuit has low yields and high costs.

SUMMARY

A first aspect of the present application discloses an obstacle-avoidance-processor chip for three-dimensional path planning. The obstacle-avoidance-processor chip comprises an analog processing circuit and at least two analog-resistive-grid networks. The analog processing circuit is communicatively coupled to receive data from an inertial measurement unit and from at least one obstacle-detection sensor. The analog processing circuit is configured to construct a three-dimensional obstacle map of an environment based on the received data. The at least two analog-resistive-grid networks are configured to map obstacles in at least two respective non-parallel planes in the constructed three-dimensional obstacle map. The at least two analog-resistive-grid networks form a quasi-three-dimensional representation of the environment. The obstacle-avoidance-processor chip generates information indicative of a three-dimensional unobstructed path in the environment based on the obstacle maps.

DRAWINGS

In accordance with common practice, the various described features are not drawn to scale but are drawn to emphasize features relevant to the present invention. Like reference characters denote like elements throughout the figures and text.

DETAILED DESCRIPTION

In the following detailed description, reference is made to the accompanying drawings that form a part hereof, and in which is shown by way of illustration specific illustrative embodiments in which the invention may be practiced. These embodiments are described in sufficient detail to enable those skilled in the art to practice the invention, and it is to be understood that other embodiments may be utilized and that logical, mechanical and electrical changes may be made without departing from the scope of the present invention. The following detailed description is, therefore, not to be taken in a limiting sense.

An electronic device that solves Laplace's equation in three-dimensions a relatively simple circuit is described herein. The electronic device includes an obstacle-avoidance-processor chip that solves Laplacian equations in a quasi-three-dimensional space. The obstacle-avoidance-processor chip is able to generate an unobstructed three-dimensional path for a vehicle housing the obstacle-avoidance-processor chip. The obstacle-avoidance-processor chip regenerates a revised unobstructed three-dimensional path as objects move into and/or near the unobstructed path of the vehicle that houses the obstacle-avoidance-processor chip.

Figure 1:
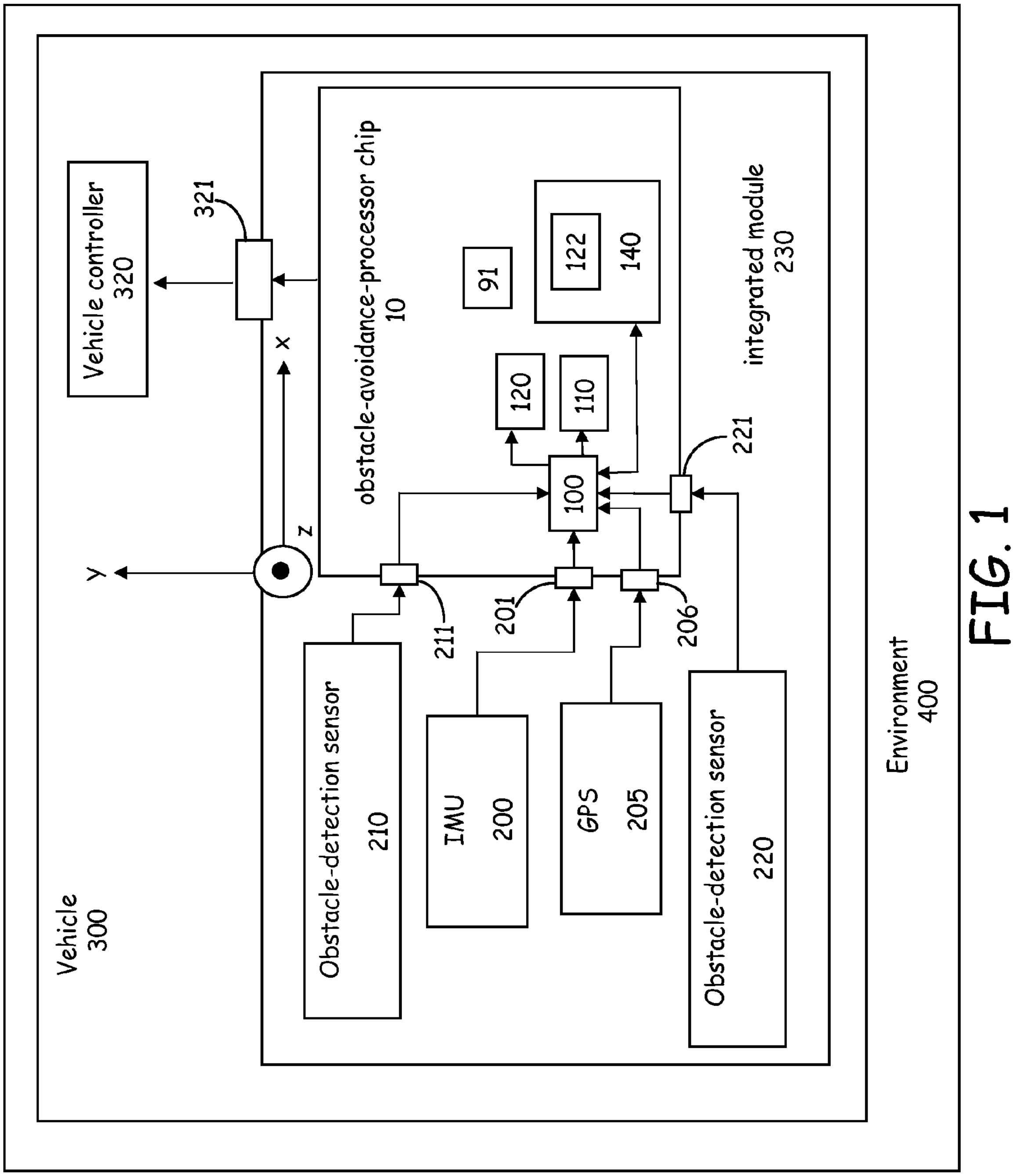
FIG. 1 is an integrated module positioned in a vehicle in accordance with one embodiment of the invention.

FIG. 1 is an integrated module 230 positioned in a vehicle 300 in accordance with one embodiment of the invention. The integrated module 230 includes an obstacle-avoidance-processor chip 10 for three-dimensional path planning, an inertial measurement unit (IMU) 200, a global positioning system (GPS) 205, and obstacle-detection sensors 210 and 220. The obstacle-avoidance-processor chip 10 for three-dimensional path planning includes an analog processing circuit 100 and at least two analog-resistive-grid networks 110 and 120. The analog-resistive-grid networks 110 and 120 form a quasi-three-dimensional representation of the environment. The obstacle-avoidance-processor chip generates information indicative of an unobstructed path in the environment based on generated obstacle maps.

The analog processing circuit 100 is communicatively coupled to receive data from the inertial measurement unit 200, the global positioning system 205, and from the obstacle-detection sensors 210 and 220. The obstacle-avoidance-processor chip 10, the inertial measurement unit 200, the obstacle-detection sensors 210 and 220, and the global positioning system 205 are positioned in or on vehicle 300. The vehicle 300 is located in the environment 400 having a three-dimensional coordinate system (X, Y, Z).

The first input interfaces 211 and 221, which receive sensor data indicative of obstacles in the environment from the obstacle-detection sensors 210 and 220, respectively, communicatively couple the obstacle-detection sensor 210 and 220 to analog processing circuit 100. The second input interface 201, which receives sensor data indicative of a relative position of the vehicle 300 in the environment 400 from the inertial measurement unit 200, communicatively couple the inertial measurement unit 200 to the analog processing circuit 100. The input interface 206, which receives sensor data indicative of a geographic position of the vehicle 300 in the environment 400 from the global positioning system 205, communicatively couples the global positioning system 205 to the analog processing circuit 100.

As shown in FIG. 1, the obstacle-avoidance-processor chip 10 in the integrated module 230 is communicatively coupled to a vehicle controller 320 via an interface 321. The vehicle controller 320 uses the information generated about the unobstructed three-dimensional path to control the heading and speed of the vehicle 300 in order to avoid collision with objects in the environment 400. The terms "unobstructed path" and "unobstructed three-dimensional path" are used interchangeably in this document. Any currently unobstructed path is updated to form a new currently unobstructed path when obstacles for the vehicle 300 are sensed by the obstacle-detection sensors 210 and 220. In one implementation of this embodiment, there is no global positioning system 205 in the integrated module 230.

The obstacle-avoidance-processor chip 10 executes software 122 and/or firmware that causes the obstacle-avoidance-processor chip 10 to perform at least some of the processing described here as being performed by the obstacle-avoidance-processor chip 10. At least a portion of such software 122 and/or firmware executed by the obstacle-avoidance-processor chip 10 and any related data structures are stored in storage medium 140 during execution. In one implementation of this embodiment, a memory 91 is included in the obstacle-avoidance-processor chip 10. In one such embodiment, the memory 91 comprises any suitable memory now known or later developed such as, for example, random access memory (RAM), read only memory (ROM), and/or registers within the obstacle-avoidance-processor chip 10. In one implementation, the obstacle-avoidance-processor chip 10 comprises a microprocessor or microcontroller.

Figures 2A, 2B:
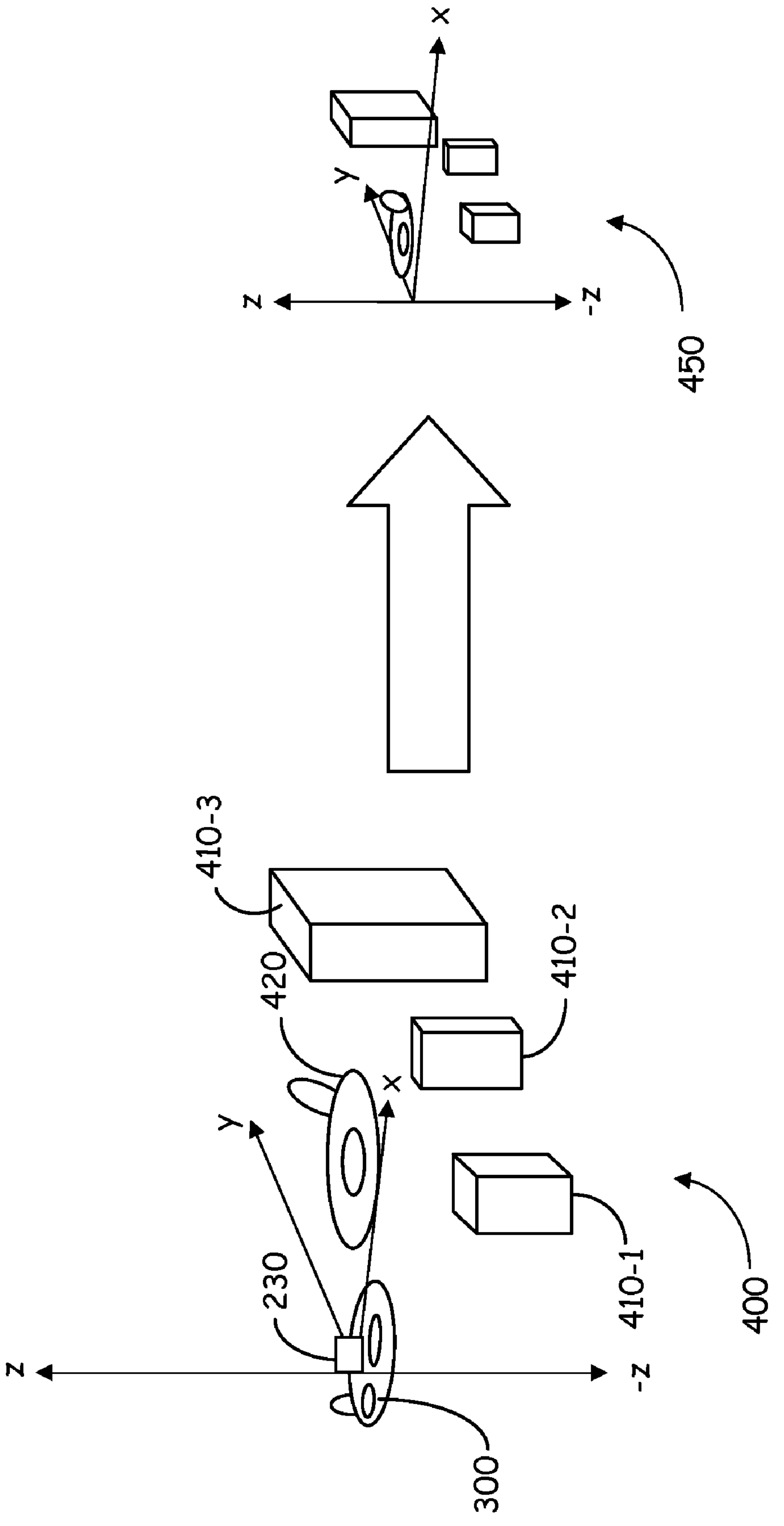
FIG. 2A shows the vehicle of FIG. 1 in an obliquely viewed three-dimensional environment.
FIG. 2B shows an obliquely viewed three-dimensional map of the environment constructed in accordance with one embodiment.

FIG. 2A shows the vehicle 300 of FIG. 1 in an obliquely viewed three-dimensional environment 400. The environment 400 and the integrated module 230 are spanned by the coordinate system axes X, Y, and Z. The origin of the coordinate system (X, Y, Z) is at the integrated module 230 housed in the vehicle 300.

An exemplary vehicle 300 is an aircraft, also referred to herein as aircraft 300. As shown in FIG. 2A, the aircraft 300 is located in an X-Y plane of the coordinate system (X, Y, Z), referred to herein as the "X-Y vehicle plane." The aircraft 300 is moving with a heading parallel to and in the direction of the positive X-axis. A second aircraft 420 shown in the exemplary environment 400 is located in an X-Y plane that intersects a point of the positive Z-axis. The second vehicle 420 is moving with a heading parallel to and in the direction of the negative X-axis. A plane that includes the ground surface in this exemplary environment 400 is referred to herein as the "X-Y ground plane." The X-Y ground plane is parallel to the X-Y vehicle plane and intersects a negative point of the Z-axis. The X-Y ground plane is shown to support objects 410(1-3). The objects 410(1-3) and the second aircraft 420 are obstacles to be avoided by the vehicle 300. The objects 410(1-3) can be buildings, trees, other vehicles, and/or people.

The inertial measurement unit 200 senses the heading of the vehicle 300 in which the obstacle-avoidance-processor chip 10 is positioned. The global positioning system 205 senses the geographic location of the vehicle 300 in which the obstacle-avoidance-processor chip 10 is positioned. The obstacle-detection sensors 210 and 220 sense the environment 400 external to the vehicle 300.

In one implementation of this embodiment, the obstacle-detection sensors 210 and 220 form a stereo-optical-imaging system. In this case, the data sensed by the obstacle-detection sensors 210 and 220 is stereoscopic data, which is used to construct a three-dimensional obstacle map 450. In one such embodiment, the obstacle-detection sensor 210 is on a port wing of the aircraft 300 and the obstacle-detection sensor 220 is on a starboard wing of the aircraft 310. In another implementation of this embodiment, there is only one obstacle-detection sensor in or on the aircraft 300. In yet another implementation of this embodiment, at least one obstacle-detection sensor comprises an optical imaging system or a radar imaging system. In yet another implementation of this embodiment, the obstacle-detection sensors 210 and 220 are radar sensors.

Based on the received data, the analog processing circuit 100 constructs a three-dimensional obstacle map 450, which is a scaled mapping of the environment 400. FIG. 2B shows an obliquely viewed three-dimensional obstacle map 450 of the environment 400 constructed in accordance with one embodiment. The three-dimensional obstacle map 450 does not show the vehicle 300 since the obstacle-detection sensors 210 and 220 positioned in or on the vehicle 300 do not visually sense the vehicle 300.

Figure 3A:
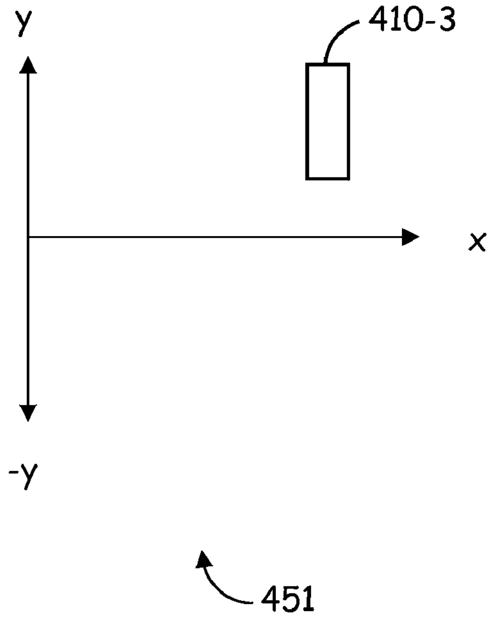
FIG. 3A shows a two-dimensional plane spanned by the X and Y axes of the three-dimensional map of FIG. 2B.

FIG. 3A shows a two-dimensional plane 451 spanned by the X and Y axes of the three-dimensional obstacle map 450 of FIG. 2B. The two-dimensional plane 451 is also referred to herein as the "first plane 451." The first plane 451 is representative of the X-Y vehicle plane in which the vehicle 300 is moving. The outline of the object 410-3 indicates that the object 410-3 intersects the first plane 451.

Figure 3B:
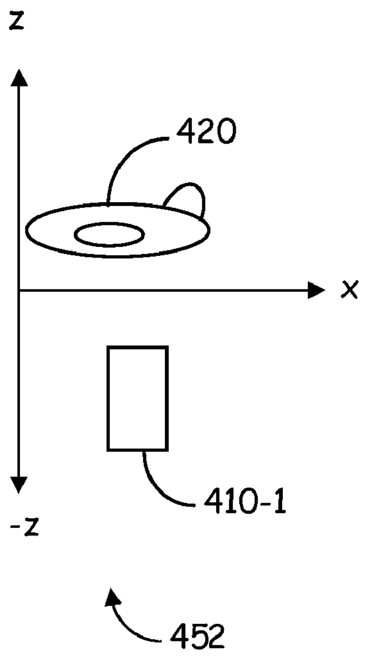
FIG. 3B shows a two-dimensional plane spanned by the X and Z axes of the three-dimensional map of FIG. 2B.

FIG. 3B shows a two-dimensional plane 452 spanned by the X and Z axes of the three-dimensional obstacle map 450 of FIG. 2B. The two-dimensional plane 452 is also referred to herein as the "second plane 452." The first plane 451 and the second plane 452 are two non-parallel planes in the three-dimensional obstacle map 450 (FIG. 2B). In this embodiment, the second plane 452 is orthogonal to the first plane 451. In other embodiments, the second plane 452 is not orthogonal to the first plane 451. In the embodiment illustrated by FIGS. 2A-3B, the second plane 452 includes the line indicative of the heading of the vehicle 300, which in this embodiment is the positive X axis, although this is not necessary for implementation of the obstacle-avoidance-processor chip 10. In one implementation of this embodiment in which the obstacle-avoidance-processor chip 10 is implemented, the second plane 452 changes as the heading of the vehicle 300 changes.

In the exemplary embodiment shown in FIGS. 3A and 3B, object 410-1 is below the vehicle 300 and the second vehicle 420 is above the vehicle 300 since the vehicle 300 is positioned around the origin of the coordinate system (X, Y, Z) and since object 410-1 and the second vehicle 420 intersect the X-Z plane below and above, respectively, the X-Y vehicle plane in which the vehicle 300 is moving.

Figure 4:
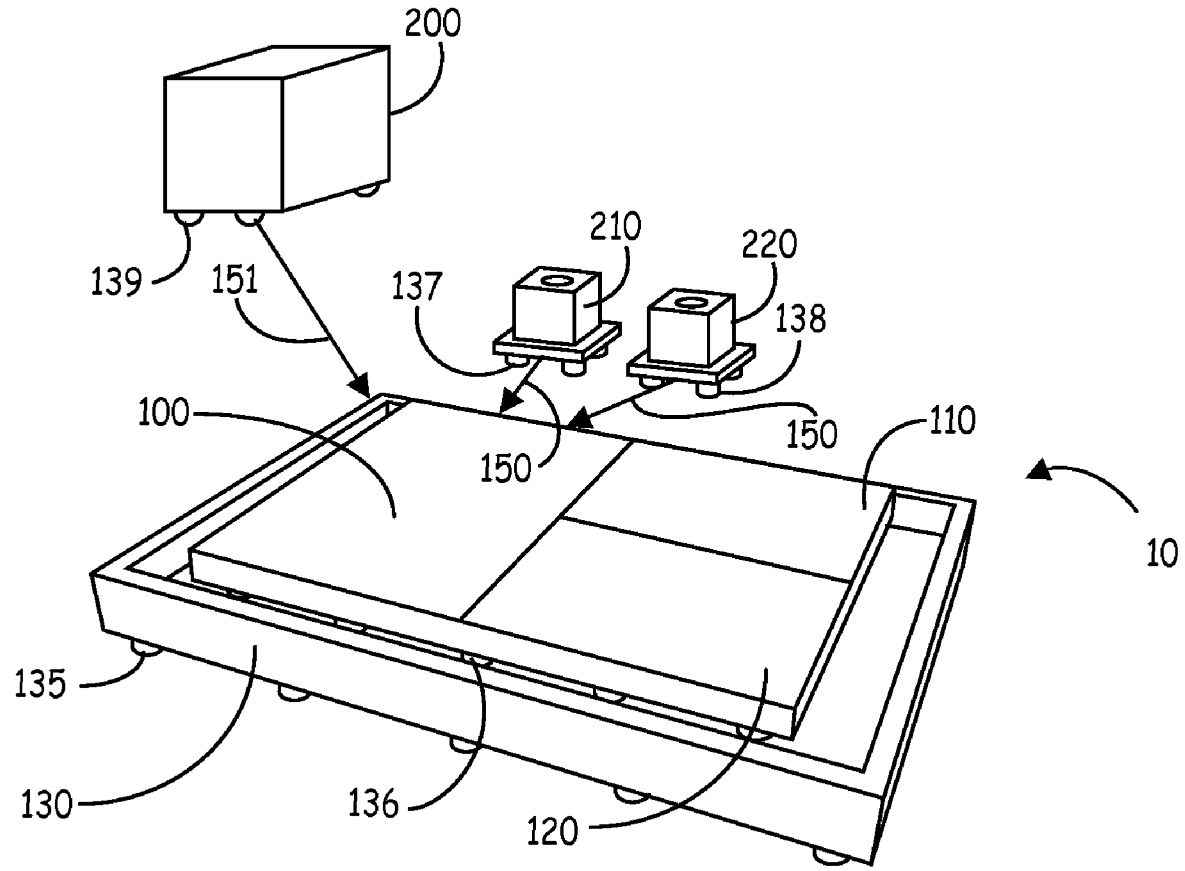
FIG. 4 illustrates one embodiment of the obstacle-avoidance-processor chip communicatively coupled to sensors and an inertial measurement unit.

FIG. 4 illustrates one embodiment of the obstacle-avoidance-processor chip 10 communicatively coupled to sensors 210 and 220 and an inertial measurement unit 200. The obstacle-avoidance-processor chip 10 for three-dimensional path planning includes an analog processing circuit 100 and at least two analog-resistive-grid networks 110 and 120. The analog processing circuit 100 is communicatively coupled to receive data from the inertial measurement unit 200 and the obstacle-detection sensors 210 and 220.

The arrows 150 are indicative of the communicative coupling between the obstacle-detection sensors 210 and 220 and the analog processing circuit 100. The arrow 151 is indicative of the communicative coupling between the inertial measurement unit 200 and the analog processing circuit 100. In the exemplary embodiment shown in FIG. 4, the analog processing circuit 100 and the two analog-resistive-grid networks 110 and 120 are flip-chip bonded to chip 130 by conductive bonds 136. The conductive bonds 136 are used to communicatively couple the analog processing circuit 100 to the analog-resistive-grid network 110 and analog-resistive-grid network 120. Other chip configurations are possible.

The conductive bonds 135 are coupled via other circuits, wires, and/or lead lines to the conductive bonds 139 of the inertial measurement unit 200 and the conductive bonds 137 and 138 of the obstacle-detection sensors 210 and 220, respectively. In one implementation of this embodiment, the inertial measurement unit 200 and the obstacle-detection sensors 210 and 220 are communicatively coupled to the obstacle-avoidance-processor chip 10 via a wireless communication link.

The analog-resistive-grid networks 110 and 120 are configured to map obstacles in at least two respective non-parallel planes, such as the first plane 451 and the second plane 452 (FIGS. 3A and 3B, respectively) in the three-dimensional obstacle map 450 (FIG. 2B). The analog-resistive-grid networks 110 and 120 form a quasi-three-dimensional representation of the environment. The quasi-three-dimensional representation of the environment is used by the obstacle-avoidance-processor chip 10 to generate an unobstructed path in the environment 400. The obstacle-avoidance-processor chip 10 solves Laplacian equations in the first plane 451 and the second plane 452. The solutions to the Laplacian equations are distributed to generate the two two-dimensional obstacle maps which are configured in the analog-resistive-grid network 110 and analog-resistive-grid network 120

Figure 5A:
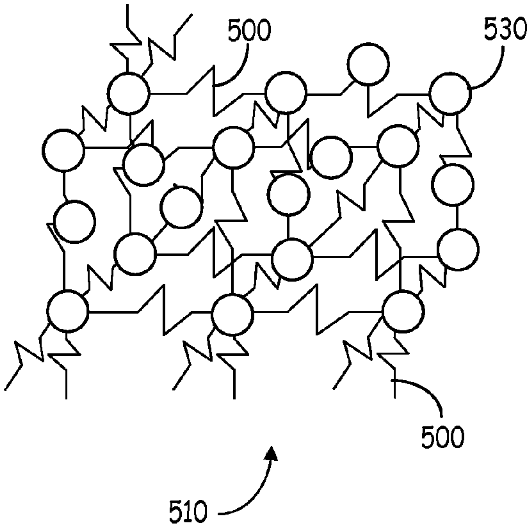
FIGS. 5A and 5B shows resistors and potentials in an exemplary high-density analog-resistive-grid network and an exemplary low-density analog-resistive-grid network in accordance with one embodiment.
Figure 5B:
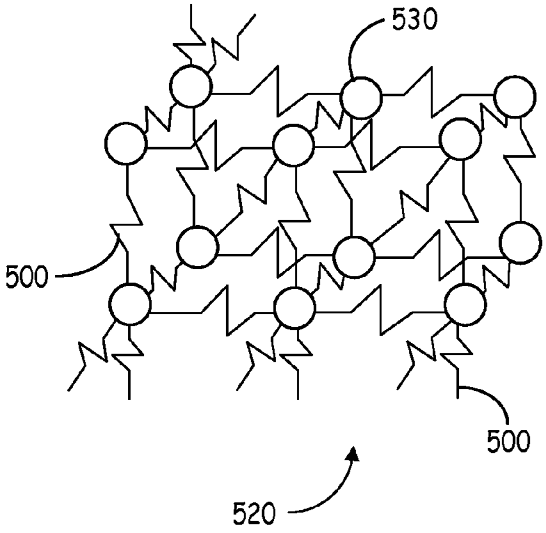

FIGS. 5A and 5B shows resistors and potentials in an exemplary high-density analog-resistive-grid network 510 and an exemplary low-density analog-resistive-grid network 520, in accordance with one embodiment. The resistors are represented generally at 500 and the potentials are represented generally at 530.

The high-density analog-resistive-grid network 510 is configured to map the two-dimensional plane 451 (FIG. 3A) spanned by the X and Y axes of the constructed three-dimensional obstacle map 450 (FIG. 2B). The vehicle 300 is moving in the X-Y plane. In order to avoid collisions with objects in this plane of travel, the resistive grid map is densely populated with potentials, i.e., it is a high-density analog-resistive-grid network. In the exemplary case illustrated in FIGS. 1-4, the analog-resistive-grid network 110 is configured as a first high-density analog-resistive-grid network 510 that maps obstacles in the first plane 451 (FIG. 3A) in which the vehicle 300 is moving. As the vehicle 300 (FIGS. 1 and 2A) moves, the environment 400 changes and the potentials in the high-density analog-resistive-grid network 510 change to reflect the motion of the vehicle 300. Some potentials drop off as they are effectively behind the vehicle and new potentials are added as they effectively move into sight of the vehicle 300.

The low-density analog-resistive-grid network 520 is configured to map the two-dimensional plane 452 (FIG. 3B) spanned by the X and Z axes of the constructed three-dimensional obstacle map 450 (FIG. 2B). Since the vehicle 300 is heading along a line in this plane, the resistive grid map is sparsely populated with potentials, i.e., it is a low-density analog-resistive-grid network. In this manner, the size of the obstacle-avoidance-processor chip 10 is reduced and the speed of the obstacle-avoidance-processor chip 10 is increased while still avoiding obstacles that are above or below the vehicle 300 but not directly in the plane of travel. In the exemplary case illustrated in FIGS. 1-4, the analog-resistive-grid network 120 is configured as a second low-density analog-resistive-grid network 520 that maps obstacles in a second plane 452 (FIG. 3B) that includes the line indicative of a heading of the vehicle 300. As the vehicle 300 (FIGS. 1 and 2A) moves and the environment 400 changes, the potentials in the low-density analog-resistive-grid network 520 change to reflect the motion of the vehicle 300 as described above.

A first selected-potential on the analog-resistive-grid networks indicates an obstacle, such as object 410-3 as shown in FIG. 3A or second vehicle 420 shown in FIG. 3B. A second selected potential having a value less than the first selected potential indicates a destination for the vehicle 300. Boundary conditions for the Laplacian equations are set so that the resistors in the grid represent points in space and the distance between the points in space. The obstacle-detection sensors 210 and 220, the inertial measurement unit 200, and the global positioning system 205 iteratively send range data, orientation data, and location data to the obstacle-avoidance-processor chip 10. The analog processing circuit 100 tracks the current location of the vehicle 300 on the high-density analog-resistive-grid network 510 and low-density analog-resistive-grid network 520. As the current location of the vehicle 300 changes, the map of the high-density analog-resistive-grid network 510 and low-density analog-resistive-grid network 520 slides along with the travel of the vehicle 300. In one implementation of this embodiment, the vehicle's final destination comprises a series of waypoints that lead to the final destination. In this case, a first waypoint is selected as the destination and when the vehicle approaches the first waypoint, the second waypoint is implemented as the destination, and so forth until the final destination is reached.

When obstacles are sensed by the obstacle-detection sensors 210 and 220, the analog processing circuit 100 generates probability-of-collision data to determine if the obstacles are within the two-dimensional planes being mapped by the high-density analog-resistive-grid network 510 and low-density analog-resistive-grid network 520. The analog processing circuit 100 generates a pre-selected voltage on at least one obstacle map (i.e., the high-density analog-resistive-grid network 510 or low-density analog-resistive-grid network 520) when a probability-of-collision exceeds a pre-selected threshold.

Specifically, the point on that analog-resistive-grid network that corresponds to the position of the obstacle is set to the first selected-potential and the position of the destination is set to the second selected potential that is less than the first selected potential. An unobstructed three-dimensional path is generated by following a potential gradient from a potential of a current-location of the vehicle 300 as represented by a point on the analog-resistive-grid networks 110 and 120. When an obstacle is added to (or removed from) either the high-density analog-resistive-grid network 510 or the low-density analog-resistive-grid network 520, the analog processing circuit 110 generates a new unobstructed three-dimensional path. The last generated unobstructed three-dimensional path is the currently-planned unobstructed path.

In this manner, the obstacle-avoidance-processor chip 10 generates information indicative of at least one unobstructed path in the environment based on the obstacle maps on the first high-density analog-resistive-grid network 110 and the second low-density analog-resistive-grid network 120. The information indicative of at least one unobstructed path is implemented to determine a velocity of a vehicle housing the integrated module. The received sensor data is used to update voltage points on the at least two analog-resistive-grid networks. In one implementation of this embodiment, there is a third low-density analog-resistive-grid network that maps obstacles in a third plane that is non-parallel to the first plane 451 and the second plane 452. In this embodiment, the third plane is mapped in a low-density analog-resistive-grid network 520.

In one implementation of this embodiment, the second selected potential that indicates a destination for the vehicle 300 is −1 Volt and the first selected potential on the analog-resistive-grid networks for obstacles is ground. Other first and second selected potentials are possible.

In one implementation of this embodiment, the analog processing circuit 100 is an analog stereo processing circuit 100 configured to construct the three-dimensional obstacle map 450 by fusing information indicative of the currently-planned-unobstructed path with sensor data received from at least two obstacle-detection sensors 210 and 220 that are spatially offset from each other and the inertial measurement unit 200. In one implementation of this embodiment, the analog processing circuit is communicatively coupled to receive data from a global positioning system.

Figure 6:
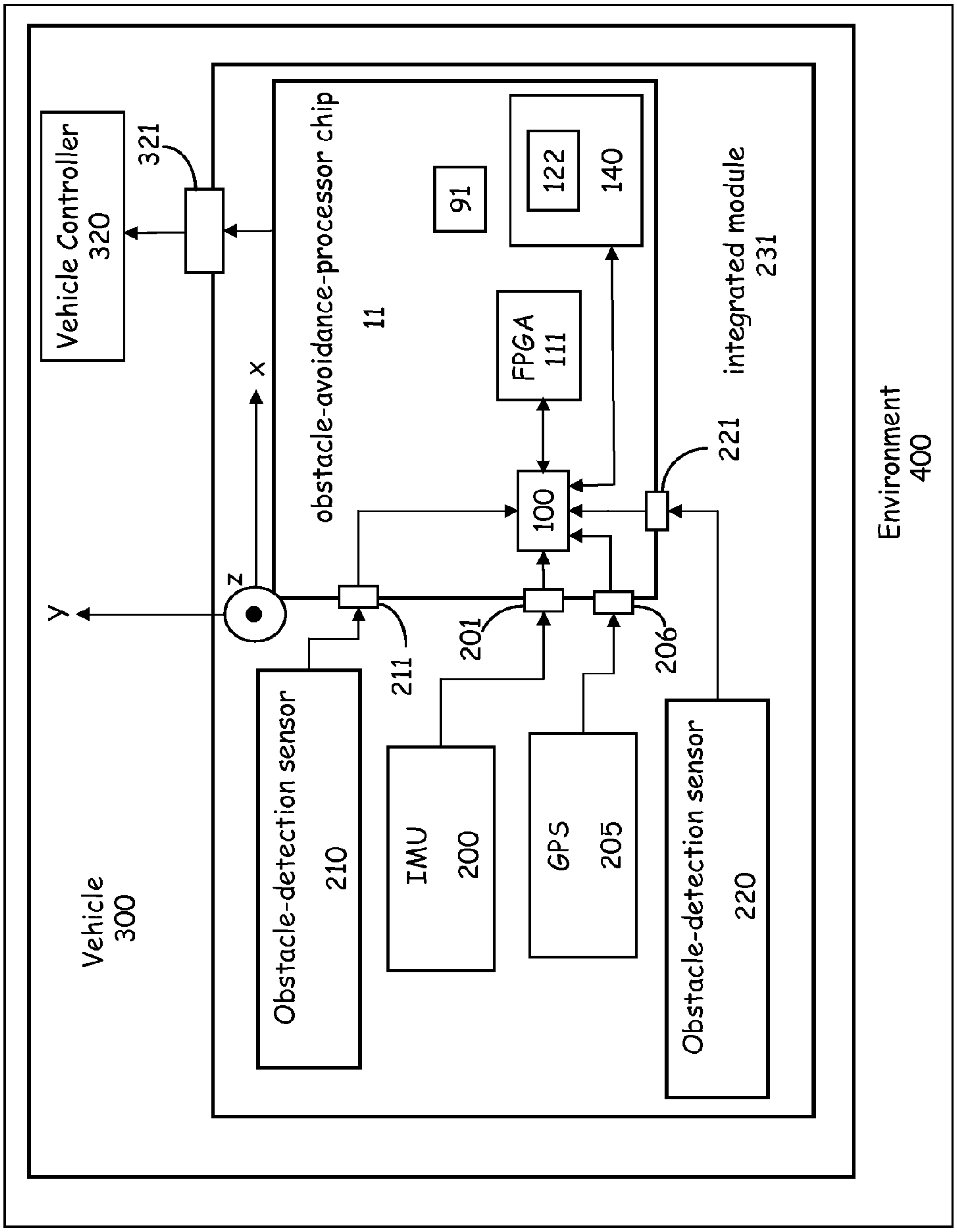
FIG. 6 is an integrated module positioned in a vehicle in accordance with another embodiment.

FIG. 6 is an integrated module 231 positioned in a vehicle 300 in accordance with another embodiment. The integrated module 231 differs from the integrated module 230 of FIG. 1 in that the at least two analog-resistive-grid networks 110 and 120 are replaced by a field programmable gate array (FPGA) 111. The field programmable gate array implements a Laplacian algorithm to map obstacles in at least two non-parallel planes (such as first plane 451 and second 452 in FIGS. 3A and 3B, respectively) representative of at least two respective cross-sections of the three-dimensional obstacle map 450 (FIG. 2B). The at least two respective cross-sections of the three-dimensional obstacle map 450 form a quasi-three-dimensional representation of the environment 400 (FIG. 2A). The obstacle-avoidance-processor chip 11 generates information indicative of an unobstructed three-dimensional path in the environment 400 based on generated obstacle maps.

The analog processing circuit 100 interfaces with the inertial measurement unit 200, the global positioning system 205, and the obstacle-detection sensors 210 and 220 as described above with reference to FIGS. 1-5B. The analog processing circuit 100 is configured to construct a three-dimensional obstacle map 450 (FIG. 2B) based on the received data. In this embodiment, the field programmable gate array 111 implements a Laplacian algorithm to generate the unobstructed path based on the detected obstacles. The field programmable gate array 111 outputs information indicative of the unobstructed path to the analog processing circuit 100 or to another processor in the obstacle-avoidance-processor chip 11. This information indicative of the unobstructed three-dimensional path is sent to the vehicle controller 320 to be used to control the velocity of the vehicle 300.

Figure 7:
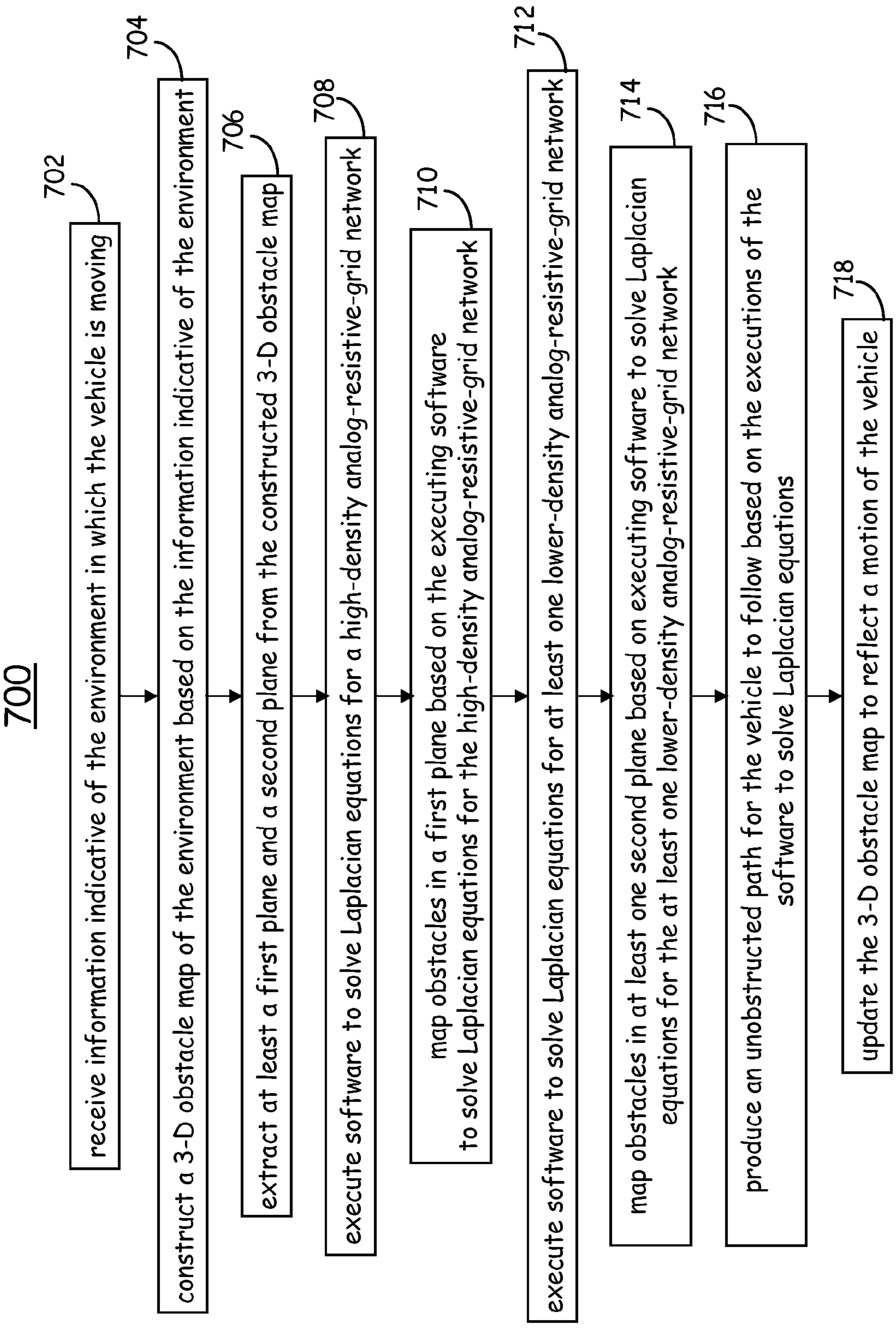
FIG. 7 is a flow diagram for a method to plan an unobstructed three-dimensional path for a vehicle in accordance with one embodiment.

FIG. 7 is a flow diagram for a method 700 to plan an unobstructed three-dimensional path for a vehicle in accordance with one embodiment. Method 700 can be implemented by the integrated module 230 housing the obstacle-avoidance-processor chip 10 as shown in FIG. 1, or the integrated module 231 housing the obstacle-avoidance-processor chip 11 as shown in FIG. 6.

At block 702, information indicative of the environment in which the vehicle is moving is received. In one implementation of this embodiment, the environment is the environment 400 for vehicle 300 as shown in FIGS. 1 and 6. At block 704, a three-dimensional environment is constructed based on the information indicative of the environment. In one implementation, information indicative of obstacles in the environment 400 (FIG. 2A) is received from obstacle detection sensors 210 and 220 in order to construct the three-dimensional obstacle map 450.

At block 706, at least a first plane and a second plane, which is non-parallel to the first plane, are extracted from the constructed three-dimensional obstacle map at block 704. The first plane is indicative of the plane in which the vehicle is moving. The second plane is indicative of a plane containing a line indicative of a heading of the vehicle. In one implementation of this embodiment, the first plane is the first plane 451 (FIG. 3A) spanned by the X and Y axes of the constructed three-dimensional obstacle map 450 and the second plane is the second plane 452 (FIG. 3B) spanned by the X and Z axes of the constructed three-dimensional obstacle map 450. In another implementation of this embodiment, the second plane does not include the line indicative of a heading of the vehicle.

At block 708, software to solve Laplacian equations is executed for the high-density analog-resistive-grid network. In one implementation of this embodiment, the software is the software 122 executed by the analog processing circuit 100 as shown in FIGS. 1 and 6.

At block 710, obstacles in a first plane are mapped based on the executing software to solve Laplacian equations for the high-density analog-resistive-grid network of block 708. The mapped obstacles are represented as a selected voltage within the high-density grid network. In one implementation of this embodiment, the first plane 451 is mapped for a high-density analog-resistive-grid network 510 as shown in FIG. 5A.

At block 712, software is executed to solve Laplacian equations for at least one lower-density analog-resistive-grid network. In one implementation of this embodiment, software is executed to solve Laplacian equations for two or more lower-density analog-resistive-grid network. In one such embodiment, the two or more lower-density analog-resistive-grid networks are representative of planes in the constructed environment that are non-parallel to the plane represented by the high-density analog-resistive-grid network. In another such embodiment, the two or more lower-density analog-resistive-grid networks represent two or more planes in the constructed environment that are not parallel to each other. In yet another such embodiment, the high-density analog-resistive-grid network and two lower-density analog-resistive-grid networks represent three planes in the constructed environment none of which are parallel to each other.

At block 714, obstacles in a second plane are mapped based on executing software to solve Laplacian equations for at least one lower-density analog-resistive-grid network. The mapped obstacles are represented as a selected voltage within the at least one lower-density analog-resistive-grid network.

At block 716, an unobstructed three-dimensional path is produced for the vehicle to follow based on the executions of the software to solve Laplacian equations. At block 718, the map is updated to reflect a motion of the vehicle.

Figure 8:
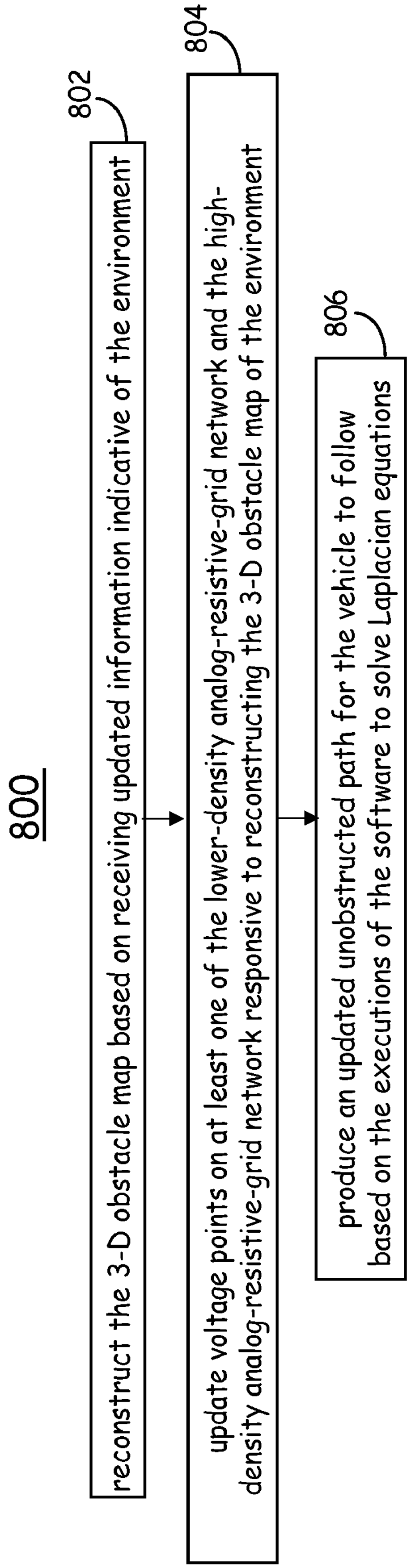
FIG. 8 is a flow diagram for a method to plan a revised-unobstructed three-dimensional path for a vehicle in accordance with one embodiment.

FIG. 8 is a flow diagram for a method 800 to plan a revised-unobstructed three-dimensional path for a vehicle in accordance with one embodiment. Method 800 can be implemented by the integrated module 230 housing the obstacle-avoidance-processor chip 10 as shown in FIG. 1 or the integrated module 231 housing the obstacle-avoidance-processor chip 11 as shown in FIG. 6.

At block 802, the three-dimensional obstacle map 450 is reconstructed based on receiving updated information indicative the environment. In one implementation of this embodiment, the updated information indicative obstacles in the environment 400 (FIG. 2A) is received from obstacle detection sensors 210 and 220 in order to construct the three-dimensional obstacle map 450 after the vehicle 300 (FIGS. 1 and 6) has moved or as new obstacles move into the environment of the vehicle 300.

At block 804, voltage points on at least one of the lower-density analog-resistive-grid network and the high-density analog-resistive-grid network are updated responsive to reconstructing the three-dimensional obstacle map 450. The updating of the voltage points occurs by implementing blocks 706-714 again. At block 806, an updated three-dimensional unobstructed three-dimensional path is produced for the vehicle to follow based on the executions of the software to solve Laplacian equations.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

What is claimed is:

1. An obstacle-avoidance-processor chip for three-dimensional path planning, the obstacle-avoidance-processor chip comprising:

an analog processing circuit communicatively coupled to receive data from an inertial measurement unit and from at least one obstacle-detection sensor, the analog processing circuit configured to construct a three-dimensional obstacle map of an environment based on the received data; and at least two analog-resistive-grid networks, configured to map obstacles in at least two respective non-parallel planes in the constructed three-dimensional obstacle map, and form a quasi-three-dimensional representation of the environment;

wherein the obstacle-avoidance-processor chip generates information indicative of a three-dimensional unobstructed path in the environment.

2. The chip of claim 1, wherein the at least two analog-resistive-grid networks comprise:

a first high-density analog-resistive-grid network configured to map obstacles in a first plane in which the vehicle is moving; and a second low-density analog-resistive-grid network configured to map obstacles in a second plane that includes a line indicative of a heading of the vehicle.

3. The chip of claim 2, wherein the second plane is orthogonal to the first plane.

4. The chip of claim 2, wherein the second plane changes as a direction of propagation of the vehicle changes.

5. The chip of claim 1, wherein a first selected-potential on the analog-resistive-grid networks indicates an obstacle, a second selected potential having a value less than the first selected potential indicates a destination, and a currently-planned-unobstructed path is generated following a potential gradient from a potential of a current location of the vehicle as represented by a point on the analog-resistive-grid networks.

6. The chip of claim 1, wherein the analog processing circuit comprises an analog stereo processing circuit configured to construct the environment by fusing information indicative of the currently-planned-unobstructed path with sensor data received from the inertial measurement unit and at least two obstacle-detection sensors that are spatially offset from each other.

7. The chip of claim 1, wherein the analog processing circuit is communicatively coupled to receive data from a global positioning system.

8. The chip of claim 1, further comprising:

at least one first input interface configured to receive sensor data indicative of obstacles in the environment from the at least one obstacle-detection sensor; and a second input interface to receive data indicative of a relative position of a vehicle in the environment from the inertial measurement unit.

9. An integrated module for three-dimensional path planning, the integrated module comprising:

an inertial measurement unit;

at least one obstacle-detection sensor; and an obstacle-avoidance-processor chip comprising:

an analog processing circuit communicatively coupled to receive data indicative of a relative position of a vehicle in an environment from the inertial measurement unit and to receive sensor data indicative of obstacles in the environment from the at least one obstacle-detection sensor, the analog processing circuit configured to construct a three-dimensional obstacle map based on the received data; and at least two analog-resistive-grid networks configured to map obstacles in at least two respective non-parallel planes, wherein the at least two analog-resistive-grid networks represent at least two respective cross-sections of a constructed three-dimensional obstacle map, wherein the at least two respective cross-sections of the constructed three-dimensional obstacle map form a quasi-three-dimensional representation of the environment, wherein the obstacle-avoidance-processor chip generates information indicative of at least one unobstructed path in the environment based on the obstacle maps.

10. The integrated module of claim 9, wherein the received sensor data is used to update voltage points on the at least two analog-resistive-grid networks.

11. The integrated module of claim 9, wherein the at least one obstacle-detection sensor comprises at least one optical imaging system or at least one radar imaging system.

12. The integrated module of claim 9, wherein the inertial measurement unit senses a heading and orientation of a vehicle housing the integrated module.

13. The integrated module of claim 9, wherein the information indicative of at least one unobstructed path is implemented to determine a velocity of a vehicle housing the integrated module.

14. The integrated module of claim 9, wherein the obstacle-detection sensor iteratively sends range data and probability-of-collision data to the obstacle-avoidance-processor chip, and wherein the obstacle-avoidance-processor chip generates a pre-selected voltage on at least one obstacle map when a probability-of-collision exceeds a pre-selected threshold.

15. A method of planning an unobstructed three-dimensional path for a vehicle, the method comprising:

receiving information indicative of the environment in which the vehicle is moving;

constructing a three-dimensional obstacle map of the environment based on the information indicative of the environment;

executing software to solve Laplacian equations for a high-density analog-resistive-grid network;

executing software to solve Laplacian equations for at least one lower-density analog-resistive-grid network; and producing an unobstructed three-dimensional path for the vehicle to follow based on the executions of the software to solve Laplacian equations.

16. The method of claim 15, further comprising:

extracting at least a first plane and a second plane non-parallel to the first plane from the constructed three-dimensional obstacle map, wherein the first plane is indicative of the plane in which the vehicle is moving, and wherein the second plane is indicative of a plane containing a line indicative of a heading of the vehicle;

mapping obstacles in a first plane based on the executing software to solve Laplacian equations for the high-density analog-resistive-grid network; and mapping obstacles in a second plane based on executing software to solve Laplacian equations for the at least one lower-density analog-resistive-grid network, wherein the mapped obstacles are represented as a selected voltage within the high-density analog-resistive-grid network and the at least one lower-density analog-resistive-grid network.

17. The method of claim 16, further comprising:

reconstructing the three-dimensional obstacle map based on receiving updated information indicative of the environment;

updating voltage points on at least one of the lower-density analog-resistive-grid network and the high-density analog-resistive-grid network responsive to reconstructing the three-dimensional obstacle map; and producing an updated unobstructed three-dimensional path for the vehicle to follow based on the executions of the software to solve Laplacian equations.

18. The method of claim 16, further comprising:

updating the map to reflect a motion of the vehicle.

* * * * *